Sept. 2, 1924.
J. H. PETROSKY
1,507,514
CONNECTING ROD
Filed Nov. 5, 1915
2 Sheets-Sheet 1
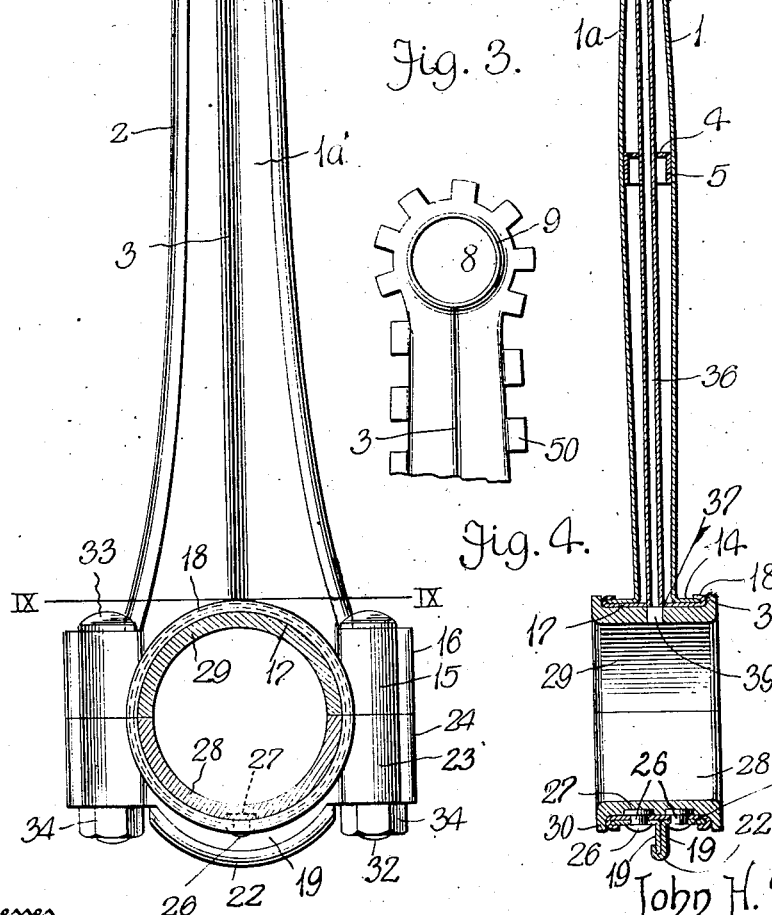

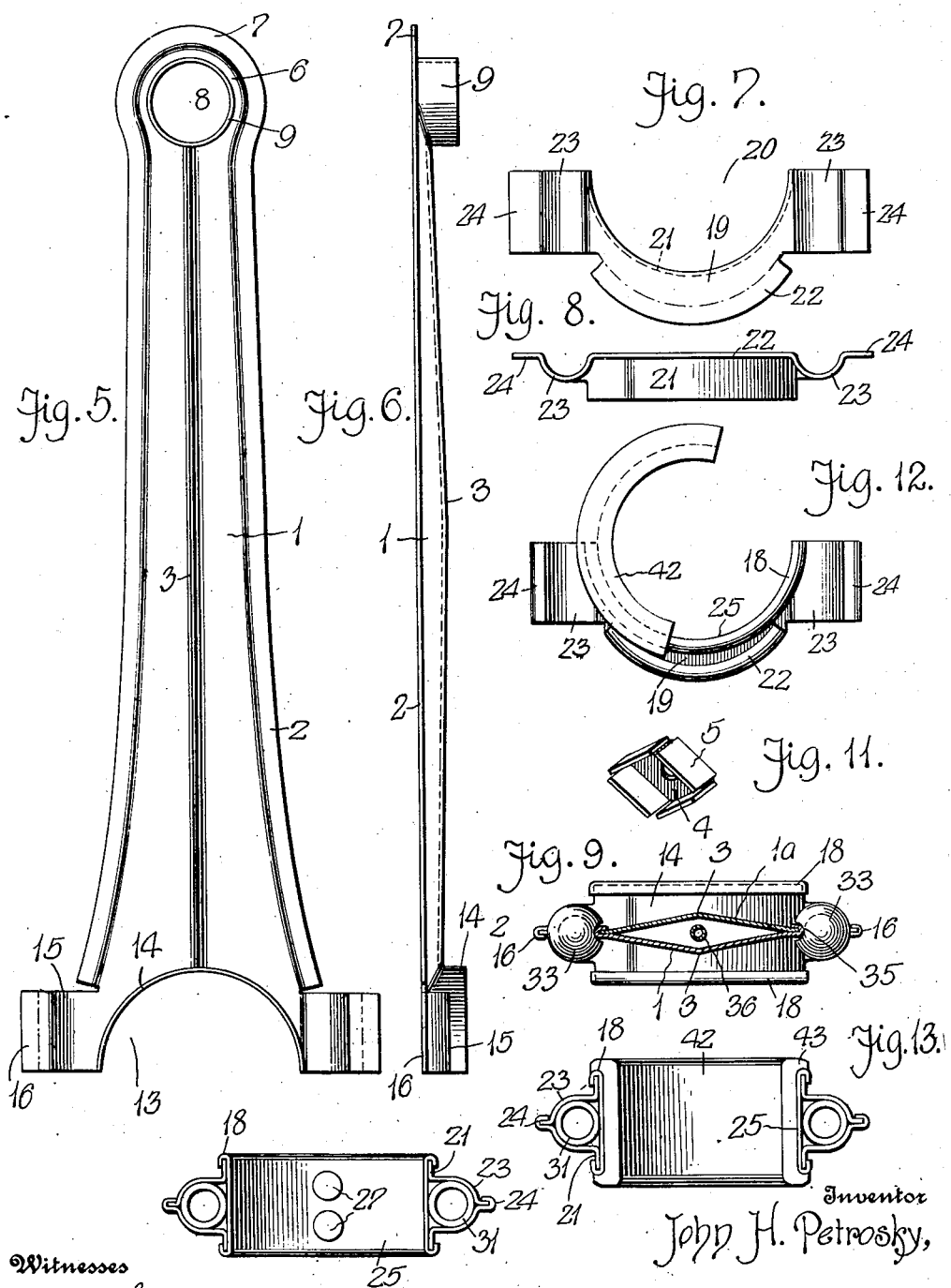

Patented Sept. 2, 1924.

1,507,514

UNITED STATES PATENT OFFICE.

JOHN H. PETROSKY, OF DETROIT, MICHIGAN, ASSIGNOR TO PACKARD MOTOR CAR COMPANY, OF DETROIT, MICHIGAN, A CORPORATION OF MICHIGAN.

CONNECTING ROD.

Application filed November 5, 1915. Serial No. 59,721.

*To all whom it may concern:*

Be it known that I, JOHN H. PETROSKY, a citizen of the United States of America, residing at Detroit, in the county of Wayne and State of Michigan, have invented certain new and useful Improvements in Connecting Rods, of which the following is a specification, reference being had therein to the accompanying drawings.

This invention relates to connecting rods, pitmans, and drive bars, and the primary object of my invention is to provide a simple, durable and inexpensive power transmitting member made of sheet metal stamped, pressed and fabricated in a manner which insures rigidity for practical purposes equal to a solid metallic member.

A further object of my invention is to provide a power transmitting member possessing sufficient tensile strength to resist stresses and strains set up by drive and driven elements, the member including effective means whereby bearing ends thereof may be thoroughly lubricated.

The above and other objects are attained by a mechanical construction that will be hereinafter described as a connecting rod, which can be advantageously used in connection with internal combustion engines, particularly of automobiles and aeroplanes where it is a desideratum that the working parts of an engine or motor be as light as possible and yet be of such construction as to insure safety.

Reference will now be had to the drawing, wherein—

Figure 1 is an elevation of a connecting rod in accordance with my invention;

Fig. 2 is a longitudinal sectional view of the same;

Fig. 3 is an elevation of a portion of a connecting rod, illustrating a modification of my invention;

Fig. 4 is an elevation of a portion of one of the members thereof;

Fig. 5 is an elevation of one of the rod members shown in Figs. 1 and 2;

Fig. 6 is an edge view of the same;

Fig. 7 is an elevation of a bearing member;

Fig. 8 is a plan of the same;

Fig. 9 is a cross sectional view taken on the line IX—IX of Fig. 1;

Fig. 10 is a plan of a bearing section;

Fig. 11 is a perspective view of a detached bridge;

Fig. 12 is an elevation of the same showing the manner of placing a bushing section in the bearing section, and Fig. 13 is a similar view of a bearing section provided with a sectional bushing.

In describing my invention by aid of the views above referred to, I desire it to be understood that such views are intended merely as illustrative of an example whereby my invention is applied in practice and I do not confine my invention to the precise construction and arrangement of parts shown. The following description is therefore to be broadly construed as including substitute constructions and arrangement of parts which are equivalents of those hereinafter referred to.

In the drawings 1 and 1ª denote members somewhat similarly shaped and produced, it being only necessary to properly assemble the members for the purpose for which they are intended. Each member is stamped and pressed from sheet metal, preferably steel, and the side edges of each member gradually taper. The side edges of the member 1 are formed with flanges 2 which are bent on to the side edges of the member 1ª, as best shown in Figs. 1 and 9, and spot welded or otherwise connected, thus providing interlocked edges affording rigid seams longitudinally of the members. Each member, for the greater part of its length, is substantially V-shaped, in cross section, thereby providing opposed longitudinal stiffening ridges 3 on the sides of a completed connecting rod. Each member is furthermore shaped so that the ridges 3 will serve functionally as trusses between the ends of a connecting rod, and to accomplish this result, each ridge has for its apex a point intermediate the ends of the member, said ridge gradually merging into the plane of the member. Such ridges tend to prevent a connecting rod from buckling or becoming distorted intermediate the ends thereof, and as a further reinforcement for the members, a bridge 4 is mounted between the members at the apices of the ridges 3. The bridge is in the form of a plate having flanges 5 spot welded or otherwise secured to the confronting sides of the members 1 and 1ª.

The tapering members 1 and 1ª necessarily provide large and small ends and for the convenience of further describing my invention and at the same time alluding to the ordinary use of a connecting rod, the large end thereof represents the drive or crank end and the small end of the rod the driven or piston end. Considering the driven end of the rod, each member terminates in a circular head 6, and one of said heads has a flange 7 as a continuation of the flanges 2 on the side edges of the member 1. The head 6 is provided with a concentric opening 8 surrounded by an outstanding ferrule 9 and when said members are properly connected together by bending the flange 7 of one member on to the head of the adjoining member and spot welding, the openings 8 and the ferrules 9 align and form a bearing. The connecting rod of the present invention therefore comprises two sheet metal members interlocked at their longitudinal edges forming a tube with bearings at the opposite ends thereof, the tube being polygonal in cross-section, one dimension of said section increasing from the ends of the tube toward the central portion and another dimension increasing from one end toward the other. As shown in the drawings the tube is diamond-shaped in cross-section.

Cooperating with the flange 7 in holding the small ends of the members together is a cylindrical liner 10 which is placed in the ferrules 9 or the bearing formed thereby and the ends of the liner beaded or overturned, as at 11, to engage the outer ends of the ferrules 9, as best shown in Fig. 2. This cylindrical liner 10 accommodates a bushing 12 and said bushing may be spot welded or otherwise fixed in the liner, thereby completing the bearing.

At the drive end of the connecting rod, the members 1 and 1ª are formed with semi-cylindrical recesses 13 and semi-cylindrical ferrules 14. The members are furthermore formed with substantially semi-cylindrical barrel sections 15 having flanges 16 which permit of the barrel sections of one member being interlocked with the barrel sections of an adjoining member to provide barrels.

The semi-cylindrical ferrules 14 of said members are connected by a semi-cylindrical liner 17, and this liner, similar to the liner 10, has the ends thereof beaded or outturned and clenched upon the ends of the ferrules 14, as indicated at 18. This large end of the connecting rod, thus far formed, represents a fixed or stationary bearing section, and reference will now be had to a detachable bearing section best shown in Figs. 1, 2, 7, 8, 9 and 10. The detachable bearing section comprises two members 19 formed with semi-circular recesses 20 and semi-cylindrical ferrules 21. One of the members has a flange 22 adapted to be bent and spot welded on the other member, thus permitting of the members 19 being connected whereby semi-cylindrical ferrules 21 aline. The members 19 are furthermore formed with semi-cylindrical barrel sections 23 having flanges 24 whereby the semi-cylindrical barrel sections of said members may be interlocked to form barrels similar to the barrels of the fixed or stationary bearing member of the connecting rod. The ferrules 21 of the bearing sections 19 are connected by a semi-cylindrical liner 25 having the ends thereof clenched on the outer ends of the ferrules 21. In addition to the beaded ends of the semi-cylindrical liner 25 holding said liner in position, there are rivets 26 and the inner ends of said rivets are adapted to fit in sockets 27 provided therefor in a semi-cylindrical bushing 28 set in the bearing section. The semi-cylindrical bushing 28 is adapted to cooperate with a similar bushing 29 in the fixed or stationary bearing member of the connecting rod. The bushing sections 28 and 29 have end flanges 30 whereby after the bearing sections are assembled, the bushing sections cannot become accidentally displaced relative to the bearing at the driven end of the connecting rod.

Mounted in the barrel sections 15 and 23 are sleeves 31, said sleeves corresponding in length to the combined length of the barrel sections 15 and 23 at each side of the connecting rod. The sleeves 31 accommodate bolts 32 having heads 33 and detachable nuts 34. The heads 33 of the bolt are notched, as at 35, whereby the interlocked side edges or seams of the connecting rod may extend into the notches 35 and prevent the bolts 32 from rotating in the sleeves 31 or the barrels of the bearing. This is best shown in Fig. 9, and any suitable means may be resorted to for locking the nuts 34 upon the bolts 32.

In order that a lubricant can be conveniently and advantageously used in connection with the bushings at the drive and driven ends of the connecting rod, a tubular conduit 36 is disposed longitudinally between the members 1 and 1ª of the connecting rod, said conduit extending through an opening 37 provided therefor in the liner 17 and said conduit is in communication with a port 39 in the bushing section 29. The opposite end of the conduit 36 extends into one of a series of radial ports 40 in the bushing 12, and these ports are in communication with an annular groove or depression 41 in the liner 10, consequently a lubricant can flow from one bushing to another. The annular depression of the liner 10 extends between the interlocked edges of the members 1 and 1ª and properly positions said liner relative to the bearing formed by the ferrules 9.

A slight modification is illustrated in Figs. 12 and 13, showing a sectional bushing 42. The sections of the bushing have channel shaped ends 43, adapted to engage the ends of the bearing member whereby the bushing sections 42 cannot become accidentally displaced when the detachable bearing section is removed from the fixed or stationary bearing section. The design of each bushing section 42 is such that the sections must be fitted or slipped on to the bearing sections, as best shown in Fig. 12. When properly positioned the bearing sections can be handled without danger of any of the bushing sections becoming accidentally displaced.

In Figs. 3 and 4 there is illustrated a slight modification of the flanged connections of the members 1 and 1ª. The members have spaced lugs 50, with the lugs at one edge of a member staggered relative to lugs at the other edgs of the member, consequently the members can be matched and the lugs bent to interlock and form what I term "interlocked" edges which also includes the preferred manner of interlocking the members of the rod.

What I claim is:—

1. A power transmitting member comprising sheet metal members having longitudinal interlocked edges, liners supported at the ends of said members, bushings in said liners, and a lubricant pipe extending from one liner to the other disposed between said members with its axis coincident with the longitudinal axis of the member.

2. A power transmitting member comprising sheet metal members having longitudinal interlocked edges, each member having a longitudinal stiffening rib, a bridge connecting said members intermediate the ends thereof, liners supported at the ends of said members, and bushings in said liners.

3. A power transmitting member comprising sheet metal members having interlocked longitudinal edges, each member having a longitudinal stiffening rib, a bridge connecting said members intermediate the ends thereof, liners supported at the ends of said members, bushings in said liners, and a lubricant conduit extending from one liner to the other and through said bridge between said members.

4. A power transmitting member embodying sheet metal members having longitudinal interlocked edges and each member having an end thereof provided with ferrules and semi-cylindrical interlocked barrels, and a bearing section adapted for attachment to the end of said member comprising interlocked bearing members having ferrules and barrels adapted to aline with the first mentioned ferrules and barrels, aligned sleeves in said barrels, and bolts in said sleeves, the ends of said barrels being flat to provide abutments for the bolt heads and nuts.

5. A connecting rod comprising two sheet metal members interlocked at their longitudinal edges forming a tube with bearings at the opposite ends thereof, a lubricant pipe disposed centrally within said tube extending from one bearing to the other, and means supporting said pipe in the tube intermediate its ends.

6. A connecting rod comprising two sheet metal members interlocked at their longitudinal edges forming a tube with bearings at the opposite ends thereof, the cross sectional dimension of said tube parallel to the axes of said bearings increasing from the ends of the tube toward the central portion thereof and the cross sectional dimension at right angles to said first dimension increasing from one end of the tube toward the other.

7. A connecting rod comprising two sheet metal members interlocked at their longitudinal edges forming a tube with bearings at the opposite ends thereof, said tube being diamond shaped in cross section, the short diagonal of said section being substantially parallel to the axes of said bearings and increasing from the ends of the tube toward the central portion.

8. A connecting rod comprising two sheet metal members interlocked at their longitudinal edges forming a tube with bearings at the opposite ends thereof, said tube being diamond shaped in cross section and a bridge member within the tube intermediate its ends to reinforce said members.

9. A connecting rod comprising two sheet metal members interlocked at their longitudinal edges forming a tube with bearings at the opposite ends thereof, said tube being polygonal in cross section, one dimension of said section increasing from one end toward the other and another dimension being greatest at the central portion of the length of the tube.

10. A connecting rod comprising two sheet metal members interlocked at their longitudinal edges forming a tube with bearings at the opposite ends thereof, one of said bearings including a cap and bolts for securing said cap having their heads formed with slots interlocked with the adjacent portion of said longitudinal edges to prevent rotation of the bolts.

In testimony whereof I affix my signature in presence of two witnesses.

JOHN H. PETROSKY.

Witnesses:
ARTHUR TUCHBAUT,
KARL H. BUTLER.